United States Patent Office 3,743,487
Patented July 3, 1973

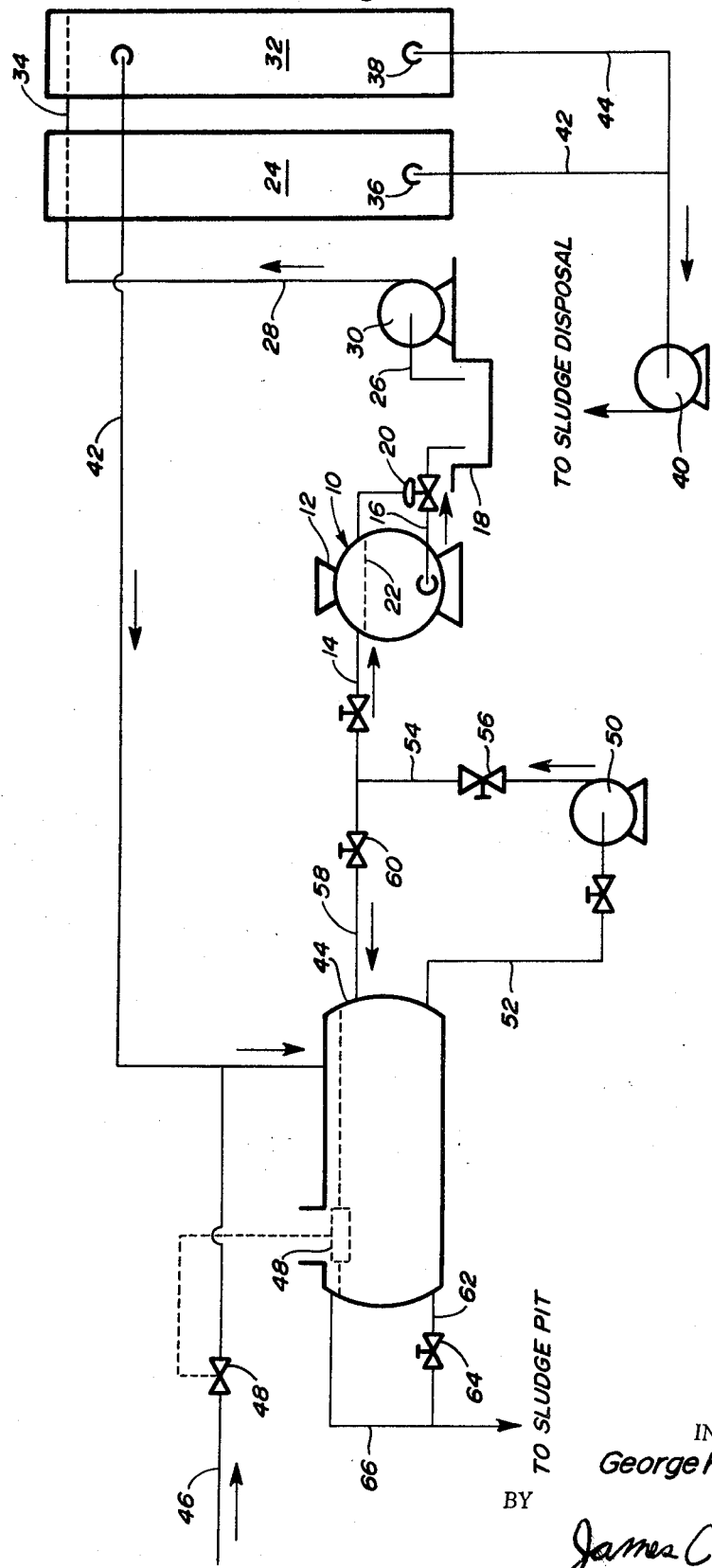

3,743,487
ACETYLENE GENERATING SYSTEM
George H. Baker, Burgettstown, Pa., assignor to Air
Products and Chemicals, Inc., Allentown, Pa.
Filed Aug. 6, 1971, Ser. No. 169,624
Int. Cl. C10h 21/16
U.S. Cl. 48—57                                    5 Claims

ABSTRACT OF THE DISCLOSURE

A system for generating acetylene gas by reacting calcium carbide and an excess of water wherein the resulting water lime slurry is treated to remove the lime sludge and the treated water is recycled for use in the reaction vessel.

BACKGROUND OF THE INVENTION

The present invention pertains to systems for reacting calcium carbide and water to produce acetylene gas for use as a fuel in cutting, welding and the like. Acetylene generating systems have been in use for a considerable period of time, one continuous generating process being disclosed in U.S. Pat. 2,701,188.

In the prior art, methods of generating acetylene, calcium carbide is reacted with an excess of water; the excess water necessary to control the large amount of heat generated. Overall reaction of calcium carbide and water follows the general equation:

$$CaC_2 + 2H_2O \rightarrow C_2H_2 + Ca(OH)_2$$

In conventional systems the large quantity of lime water slurry from the above reaction is dumped into rivers, sewers, settling ponds and the like. In dumping large amounts of lime water into natural bodies of water, the ecological balance of such bodies of water is severely disturbed with a deleterious effect on both animal and plant life.

BRIEF DESCRIPTION OF THE INVENTION

In order to avoid the above problems and to provide an improved system for generating acetylene gas, it has been discovered that the lime water slurry can be decanted by means of a plurality of settling vessels so that the water can be recycled for use in generating more acetylene. With the improved process, the resulting lime sludge is concentrated and can be removed from the system for safe disposal or reclamation of the lime for other industrial use.

Therefore, it is the primary object of this invention to provide an improved system for generating acetylene gas.

It is another object of this invention to provide a system for generating acetylene gas wherein the waste system is concentrated for easy disposal.

It is yet another object of this invention to provide a system for generating acetylene gas wherein the excess process water is recycled for reaction with additional calcium carbide.

It is still another object of this invention to provide a method of generating acetylene gas which minimizes ecological disturbance from waste disposal.

BRIEF DESCRIPTION OF THE DRAWING

The single figure of the drawing illustrates in diagrammatic form the preferred embodiment of the system according to the present invention.

DETAILED DESCRIPTION OF THE PREFERRED EMBODIMENT

Referring to the drawing there is shown a carbide generating vessel 10 with hopper 12 for supplying calcium carbide to be reacted with water supplied through conduit 14. Gaseous acetylene is removed from vessel 10 by means of suitable conduits (not shown) and used to fill gas cylinders and the like. The reaction of calicum carbide and water results in a lime water slurry residue in vessel 10 that is removed through conduit 16 to a residue or sludge pit 18. Between the pit 18 and the vessel 10 there is included in conduit 16 a control valve 20 that is activated by the water level in vessel 10 as shown by dotted line 22.

The sludge from pit 18 is fed to a first settling tank 24 through conduits 26, and 28 by means of a sludge pump 20. The first settling tank 24 is connected to a second settling tank 32 by means of conduit 34 so that only overflow from tank 24 goes into tank 32. Both tanks 24 and 32 have clean out ports 36, 38 connected to a second sludge pump 40 via conduits 42, 44 respectively. The sludge pump 40 is included so that the sludge from tanks 24 and 32 can be readily removed to a further processing area or refuse truck to be hauled away for safe disposal. Water is removed from tank 32 and fed via conduit 42 to a water surge tank 44. The water surge tank 44 provides the necessary water to supply generating vessel 10. Fresh make-up water is added to tank 44 via conduit 46. Included in conduit 46 is a float valve 48 disposed in tank 44 so that the proper level of water in surge tank 44 is automatically maintained. Water is fed to generating vessel 10 through conduit 14 by means of pump 50 and conduits 52, 54. Disposed in conduit 54 is a check valve 56. Conduit 58, with a suitable valve 60, is included for continuous circulation of water from tank 44 through pump 50 to prevent clogging of pump 50 due to sediment suspended in the recycle water. Conduit 62 with valve 64 permits draining of sludge from tank 44 to the sludge pit 18. Overflow conduit 66 is also connected to the sludge pit 18 to aid in conserving water in the system.

A system according to the invention operates to produce gaseous acetylene that is stored in cylinders, tube trailers and the like for sale as a fuel primarily to be used with oxygen in the well known oxy-fuel torch. In operation, water consisting of recycle from tank 32 and fresh or city water is withdrawn from surge tank 44 which tank has a capacity of about 1000 gallons. The water is fed to the generating vessel 10 by pump 50 which is rated at 55 gallons per minute. Pump 50 recycles a portion of the feed back to tank 44 continuously. Since excess water is fed to vessel 10, this water along with the lime sludge is taken through conduit 16 and control 20 to the sludge pit 18 at intervals determined by the level of water in vessel 10. The water and lime slurry (sludge) is pumped to a first settling tank 24 by pump 30. Here most of the solid sludge settles to the bottom of the tank 24 and the decanted water flows into a second settling tank 32 where most of the remaining sludge settles out. Tanks 24 and 32 each have a capacity of 10,000 gallons. The lime sludge is withdrawn from tanks 24 and 32 periodically and loaded into trucks by means of disposal pump 40 for removal to a safe disposal site or reclammation facility; the sludge containing a large percentage of water assuring a system purge. Water from tank 34, containing only a small fraction of lime sludge, is gravity fed to tank 44 through conduit 42, with water needed to maintain tank 44, at least half-full and not supplied by recycling water, is added from an external source (not shown) through float valve 48 in conduit 46.

Having thus described my invention, what I desire to be secured by Letters Patent of the United States is set forth in the appended claims.

I claim:
1. A method for manufacturing acetylene gas comprising the steps of:
   reacting calcium carbide and in excess of water to form acetylene gas and a lime water slurry;

removing the acetylene gas and storing said gas;

passing the lime water slurry through a first separating station where a major portion of a lime sludge is separated from the slurry;

withdrawing the remaining slurry from said first separating station and passing it through a second separating station where substantially all of the remaining lime sludge is separated from the slurry yielding a separated water portion;

recycling the separated water portion for reaction with fresh calcium carbide; and removing the lime sludge from said first and second separating stations for further processing.

2. A method according to claim 1 wherein the lime water slurry is accumulated in a sludge pit and then passed through two separating tanks in order to condition the water for recycle.

3. A method according to claim 1 wherein fresh water is added to the recycle water.

4. A system for generating acetylene gas comprising:
a vessel for reacting calcium carbide and an excess of water to produce acetylene gas and a lime water slurry;

means for removing the acetylene gas from said reacting vessel;

means for removing said lime water slurry and separating the lime sludge from the water;

means for recycling the water to said reaction vessel, said means including a sludge pit and at least two settling tanks through which the lime water slurry passes in series;

means for introducing recycled water to the system said means including a water surge tank for receiving the recycled water and fresh water to maintain a constant source of water for the reacting vessel; and means for removing the separated sludge from the system.

5. A system according to claim 4 including means to maintain the level of water in the surge tank.

References Cited
UNITED STATES PATENTS

| | | | |
|---|---|---|---|
| 1,182,151 | 5/1916 | Dressel | 48—57 |
| 1,380,200 | 5/1921 | Ferguson | 48—57 |
| 1,399,562 | 12/1921 | Imhoff | 48—57 |
| 2,055,773 | 9/1936 | Radcliff | 48—57 |
| 2,343,185 | 2/1944 | Tolm et al. | 48—216 X |

MORRIS O. WOLK, Primary Examiner

R. E. SERWIN, Assistant Examiner

U.S. Cl. X.R.

48—216